US006748286B1

(12) United States Patent
Lösch

(10) Patent No.: US 6,748,286 B1
(45) Date of Patent: Jun. 8, 2004

(54) METHOD AND APPARATUS FOR PROCESS-CONTROLLED AND CLIENT-SPECIFIC PRODUCTION OF AN ITEM

(76) Inventor: Christoph Lösch, Kalchreuther Weg 3, 90562 Heroldsberg (DE)

( * ) Notice: Subject to any disclaimer, the term of this patent is extended or adjusted under 35 U.S.C. 154(b) by 0 days.

(21) Appl. No.: 10/009,211

(22) PCT Filed: May 4, 2000

(86) PCT No.: PCT/DE00/01392

§ 371 (c)(1),
(2), (4) Date: Mar. 18, 2002

(87) PCT Pub. No.: WO00/68750

PCT Pub. Date: Nov. 16, 2000

(30) Foreign Application Priority Data

May 9, 1999 (DE) .......................... 199 21 063

(51) Int. Cl.[7] .............................................. G06F 19/00
(52) U.S. Cl. .......................................... 700/97; 700/105
(58) Field of Search ................... 700/95–97, 99–107, 700/117, 121, 213, 214, 220, 231–233; 705/8, 26, 28, 29

(56) References Cited

U.S. PATENT DOCUMENTS

| 5,089,970 | A | * | 2/1992 | Lee et al. ..................... 364/468 |
| 5,463,555 | A | * | 10/1995 | Ward et al. .................. 364/468 |
| 5,544,062 | A | * | 8/1996 | Johnston, Jr. ........... 364/468.24 |
| 5,550,735 | A | * | 8/1996 | Slade et al. .............. 364/401 R |
| 5,596,502 | A | * | 1/1997 | Koski et al. ............ 364/468.01 |
| 5,777,876 | A | * | 7/1998 | Beauchesne ........... 364/468.01 |
| 5,974,004 | A | * | 10/1999 | Dockes et al. ................. 369/30 |
| 6,141,598 | A | * | 10/2000 | Nam ............................ 700/95 |
| 6,345,259 | B1 | * | 2/2002 | Sandoval ........................ 705/7 |
| 6,424,878 | B1 | * | 7/2002 | Barker et al. ................ 700/121 |

OTHER PUBLICATIONS

The Authoritative Dictionary of IEEE Standards Terms 2000, 7th edition, Standards Information Network IEEE Press, p. 685.*

* cited by examiner

Primary Examiner—Leo Picard
Assistant Examiner—Sean Shechtman
(74) Attorney, Agent, or Firm—Steinberg & Raskin, P.C.

(57) ABSTRACT

A method for manufacturing an item in a series of sequential manufacturing steps, the method including the steps of conducting the series of sequential manufacturing steps according to instructions included in a manufacturer's data record, prior to conducting one of the sequential manufacturing steps determining whether a customer data record exists, and if the customer data record exists, automatically replacing, supplementing and/or modifying the instructions included in the manufacturer's data record with instructions included in the customer data record, and then completing the series of sequential manufacturing steps to produce the item so that it includes a characteristic specified by the customer in the customer data record.

20 Claims, 2 Drawing Sheets

METHOD AND APPARATUS FOR PROCESS-CONTROLLED AND CLIENT-SPECIFIC PRODUCTION OF AN ITEM

The invention relates to a method for the process-controlled manufacture of an item.

BACKGROUND OF THE INVENTION

In the prior art methods are known for the process-controlled manufacture of items, such as consumer goods or capital goods, in which, in the manufacture of a car, for example, the individual components are prefabricated by suppliers in a highly complex and specialized mass production and then gradually assembled on the car manufacturer's assembly line. In this process the car manufactured represents an individual customer order corresponding to the set variants offered by the manufacturer, or for marketing reasons a standard car is produced, which is marketed at the dealers even without an individual customer order. Present day process-controlled mass production is inexpensive and also permits the manufacture of a certain number, albeit a limited number of variants determined by the manufacturer, in meeting customer requirements. Thus vehicles can be ordered and manufactured in different colours and with different trim packages.

Owing to the relatively small scope for conversion of process-controlled manufacturing methods, however, any adaptation to real, individual customer requirements is not feasible.

The object of the invention therefore is to provide a method for the process-controlled manufacture of an item, in which account can be taken of individual customer requirements. The intention is furthermore to provide an item, which has been produced by process-controlled manufacturing and has customized characteristics. Finally, yet another object of the invention is to provide a manufacturer's data unit, which permits an customized production of items made by process-controlled manufacturing.

SUMMARY OF THE INVENTION

In the method according to the invention at least one process data record, which is used in a manufacturer's data unit for the control of processing and/or test facilities, is replaced, supplemented and/or modified by a customer data record.

The customer data record contains specific characteristics of the item to be manufactured that have been requested by the customer. As the customer data record replaces, supplements and/or modifies the process data record, the data in the customer data record pass into the control system for the machining and/or test facilities, so that during the process-controlled manufacturing the manufactured item is endowed with the characteristics requested by the customer according to the customer data record.

This means that in process-controlled manufacturing and in the case of a continuous manufacturing process it is possible either to manufacture standard-versions of an item according to parameters set by the manufacturer i.e. according to existing process data records, or—if customer data-records are available—it is then possible to customize the standard versions of the items to suit each customer. Production is furthermore organized cost-effectively and conversions to accommodate customer requirements can be accommodated immediately without interrupting the production flow. An item is produced which has precisely the individual characteristics requested by the customer according to the customer data record and which is thereby accepted and appreciated by the customer.

The method according to the invention therefore allows mass-produced items to be inexpensively customized so as to reliably meet the taste, wishes and appraisal of the customer. The manufacturer's range is thereby adapted directly to customer requirements, so that no items are manufactured that the customer did not want or require.

Here the term "customer" must be taken in particular to mean the end user of the manufactured item, for example the purchaser of the manufactured motor vehicle, garment or other item.

The process data records, which serve for controlling the processing/test facilities (in short, the manufacturing machines) of the manufacturer in the manufacture of the item are usually concentrated in a manufacturer's internal data bank and explicitly inaccessible from outside, especially by the customer.

According to the conventional method of manufacture, the manufacturer, especially in the case of highly complex, specialized equipment and products (for example, motor vehicles), receives a production order from a dealer, which the dealer has negotiated and defined together with the customer. The process data records of the manufacturer's internal data bank are then generally activated according to the individual order and the car is manufactured in one of the defined variants that the customer has selected from the brochure at the dealer's.

The method according to the invention now allows the customer, in this case the purchaser of the vehicle, direct access to the manufacturer's data bank and the process data records filed therein by way of a (defined) interface without having to go through dealers or other such intermediaries. The actually internal manufacturer's data bank therefore has at least one interface, which provides a connection to the outside world, that is, directly to the customer.

The customer data record is inserted into the manufacturer's internal data bank by way of this minimum of one interface of the manufacturer's internal data bank and replaces, supplements and/or modifies the existing process data records there, so that the item to be manufactured is no longer manufactured according to the standard process data records but according to the process data records which are replaced, supplemented and/or modified by the customer data record. An item is thereby produced which is manufactured for the individual customer.

In concrete terms this means, for example, that a customer who by way of a customer data record requests a certain interior colour scheme when ordering a car can achieve this by incorporating the customer data record into the manufacturer's internal data bank by way of the (defined) interface.

In applying the interior colour scheme, which can be done by printing machines, for example, account is now taken of the customer information in the customer data record and the interior is designed, that it to say coloured or tinted directly according to the customer's ideas.

All other sections of the process data records, such as those process data records relating to safety-relevant parts of the car remain unaltered.

The method according to the invention therefore allows the customer partial access, precisely definable by the manufacturer or the manufacturer's supplier, to individual data fields of the process data records and allows him to customize these.

Combining of the customer data record with the process data records as described can be accomplished by way of a customer data unit, which is connected to the manufacturer's data unit by way of a data line, e.g. on-line. The customer can therefore, for example, place orders for the manufacture of an item from home on their own personal computer, customize the item and possibly even modify it subsequently. The direct connection to the manufacturer's data unit by way of at least one interface gives the customer constant access to the manufacturer's data unit to the extent allowed by the manufacturer.

The customer data record can also be compiled with graphic, audio and/or visual elements according to an original supplied by the customer. Thus the customer himself can compile a graphic design or fabric pattern, which is then translated during printing of the respective fabric at the manufacturer's. In another example the customer can record a personal photographic motif in the customer data record and then have this motif incorporated into the continuous manufacturing process for the printing of garments or the printing of a watch face, for example.

The customer can compile the customer data record by using conversion devices, such as a scanner, to transform the photographic original into the customer data record and data format according to the interface definition of the manufacturer's data unit interface.

In order to ensure the safety of the manufacturing process, the manufacturer can block or fix specific data fields in the process data record relevant in terms of safety or other aspects, it being possible to replace, supplement or modify the data fields by means of the customer data record. In addition the manufacturer can define what data format (e.g. clock frequency, coding etc.) the customer must use in order to be able to combine the data present in the customer data record with the process data record by way of the interface.

According to a further variant of the method the manufacturer can also verify the content of the customer data record in order to ensure that despite the customized design the characteristics of the manufactured item still conform to the manufacturer's product philosophy.

All of the manufacturer's inspection and test procedures may also be omitted or automated, however, so that the customer has direct access to control of the manufacturing machines. For example, monitoring by the manufacturer can be confined to automated queries in connection with the customer data record (e.g. Is the data format correct? Can the specified customer data be translated by the manufacturing machine?). Such queries, however, may also be entirely omitted.

The item according to the invention is characterized by characteristics determined by the individual customer. An item produced by process-controlled manufacturing is thereby still inexpensive to manufacture by the continuous production process and can still possess the individual features required by the customer. The advantages of mass production (low costs) are combined with the advantages of a more manual one-off production (taking precise account of customer wishes).

The characteristics determined by the individual customer may be advantageously marked on the surface of the item, for example by inscription, coating or other method of surface application or removal. Every mass-produced item can thereby be visibly customized in accordance with the customer's notions.

In a further advantageous embodiment the customized design features relate to the content of a memory module of the item, which is provided with individual customer features. Thus it is possible, for example to provide items having speech functions (for example a children's toy), with the voice of the respective customer, thereby customizing the item. In general, many different functional and/or aesthetic characteristics of the manufactured item can be customized.

At least one process data record of the manufacturer's data unit may be supplemented by data from a customer data record via the defined interface of the manufacturer's data bank. In contrast to the conventional manufacturer's data unit, which forms a closed data system, the manufacturer's data unit according to the invention has at least one (defined) interface, which provides the customer with a connection for data communication or for data exchange and allows the customer, within limits set by the manufacturer himself, to control the manufacturing machines directly via the combination with the manufacturer's internal process data records so that the manufactured item is customized.

The manufacturer's data unit is connected by way of a data line (e.g. Internet) to the customer data unit (e.g. a personal computer). The customer data unit may be installed in the customer's home, on the manufacturer's sales premises or at the dealer's. In the latter case the dealer may also advise the customer on compiling or preparing the original for the customer data record. An essential feature is, in particular, the direct access of the customer data unit to the manufacturer's, data unit and the manufacturer's manufacturing machines.

The customer data record, which is combined with at least one process data record of the manufacturer's data unit, may comprise a large amount of data, which in addition to the characteristics of the item to be manufactured, that is the production data, may also contain order data and customer data. Thus, together with the customer data record, a production order can first be initiated at the manufacturer's and the customer's personal and address data can be transmitted to the manufacturer, so that the customized manufactured item can also be delivered directly to the customer.

BRIEF DESCRIPTION OF THE DRAWINGS

Further aspects of the invention are contained in the exemplary embodiments in the figures of the drawing, in which.

DETAILED DESCRIPTION OF THE INVENTION

Figure 1:
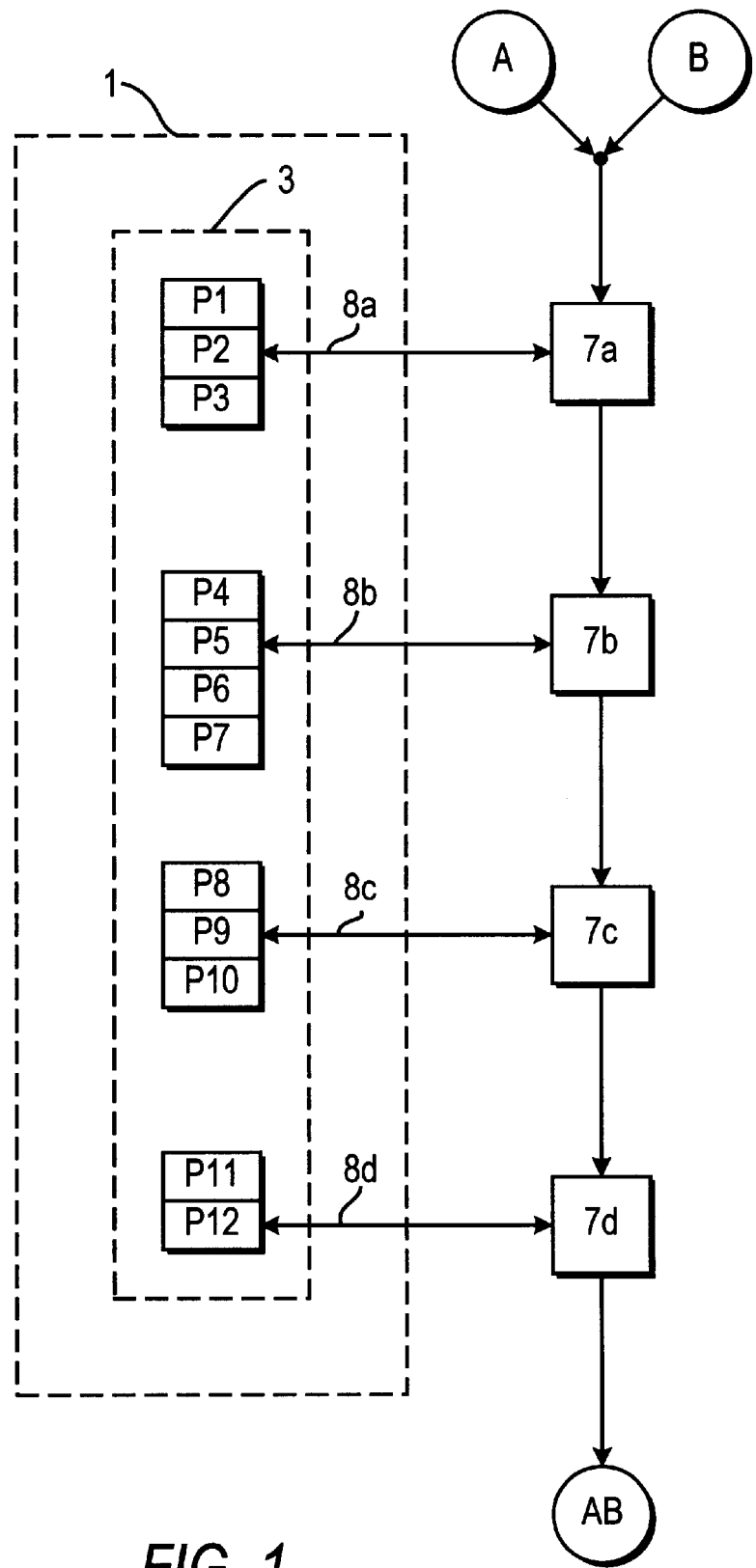
FIG. 1 shows a manufacturer's data unit according to the prior art.

FIG. 1 shows a manufacturer's data unit 1, which is usually located at or in proximity to the place of manufacture of the item or at the location where the manufacturer's supplier is based. The manufacturer's data unit 1 has a manufacturer's data bank with at least one process data record 3, which comprises process data fields P. The processing-test facilities 7 are controlled by the process data record 3 by way of connections 8.

Manufacture of the item proceeds from the individual components A and B, which after passing through the processing/test facilities 7a–7d produce the item AB.

A conventional process-controlled manufacturing process according to FIG. 1 will now be explained with reference to the production of a mobile phone A having a cover B (face panel). The manufacturing stage depicted consists of printing of the cover B with certain motifs contained in the manufacturer's process data record 3. Thus in a printing station 7a the cover is printed with motifs according to the process data P1–P3, to be then coated with a protective coating in the coating station 7b, the composition and thickness etc. of which coating is defined according to the process data P4–P7.

In the assembly station 7c the printed and coated cover B is connected to the pre-assembled mobile phone A. This is done in accordance with the process data P8–P10.

The final test station 7d checks according to the process data P11 and P12 whether the cover is correctly fixed on the mobile phone and whether all the required quality parameters are fulfilled.

The product AB, that is a mobile phone, is finally produced with fitted, printed and coated cover.

In this conventional, process-controlled manufacturing process the cover B can be printed only with specific motifs present in the process data record 3 and hence in the manufacturer's internal data bank.

Figure 2:
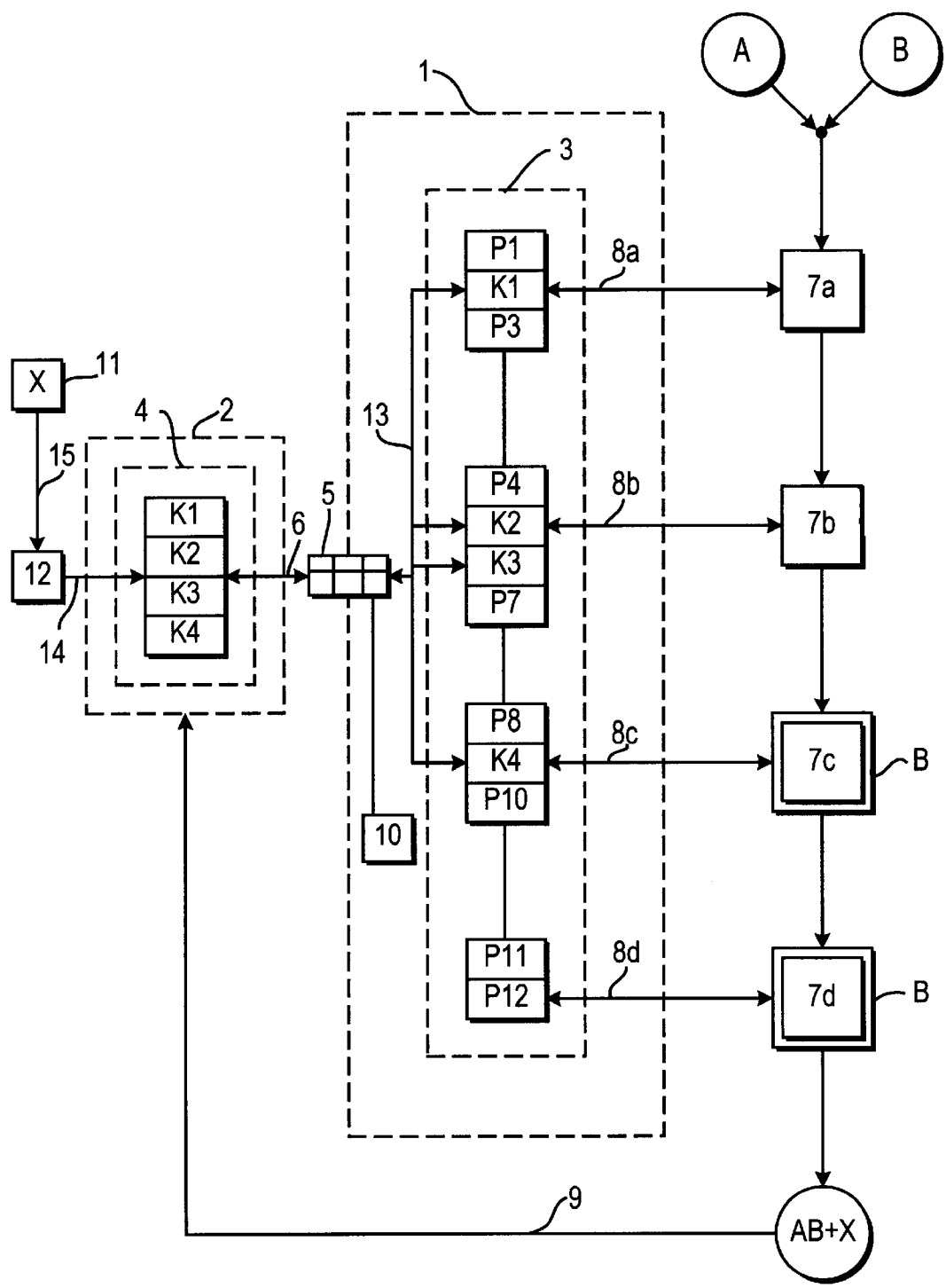
FIG. 2 shows a manufacturer's data unit and customer data unit according to the invention.

FIG. 2 sets out the method according to the invention, which enables mobile phones A to be manufactured inexpensively by a controlled process with customized, printed cover panels B+X. In contrast to the manufacturer's data unit 1 in FIG. 1, the manufacturer's data unit 1 according to FIG. 2 has an interface 5, by way of which a customer data record 4 is introduced by means of the data line 6 in order to supplement the process data record 3 of the manufacturer's data unit 1. The manufacturer's data unit 1 has a plurality of process data records 3, only one of which is depicted, however, which comprises individual sub-process data records, which control the processing and test facilities 7a–d.

The customer data unit 2, such as a personal computer of the customer and end user, contains a customer data record 4 with the customer data K1–K4. The customer data record 4 carries the features of an original printed article, voice recording, photograph or the like, the "original" be generally identified by the reference numeral 11 in the drawings. For example, a photograph with the motif "X" may serve as the "original", which is then data-processed by means of a conversion device such as a scanner 12 and serves for the configuration of the customer data record 4 by way of connections 14 and 15.

If the customer now wished to order a mobile phone, which is intended to have an customized motif X on the cover B, the following stages would be performed:

1. The customer in his customer data unit 2 compiles the customer data record 4 containing the customer data K1–K4 with the features of the motif "X".
2. The customer keys into the manufacturer's data unit 1 via the data line 6 and interface 5. A data connection thereby exists between the customer data unit 2 and the manufacturer's data unit 1, which can take the form of an on-line connection and can transmit data in one direction or both directions.
3. Downstream of the interface 5 the customer data record 4 containing the customer data K1–K4 is connected by way of the connection 13 to the process data record 3. The existing process data P2, P5, P6 and P9 are replaced, supplemented and/or modified by the customer data K1, K2, K3 and K4.

Process-controlled manufacture of the mobile phone A can now take place, the cover B being provided with the motif X specific to the customer. This is done by means of the customer data K1 at the printing station 7a.

4. Thereafter the customized motif is specifically coated in the coating station 7b, should this be required by the customer data K2 and K3.
5. In the assembly station 7c the associated sub-process data record contains the data P8, K4 and P10 for controlling the assembly station 7c, so that, here too, customer-specific assembly can be undertaken according to the customer data K4.
6. In the test station 7d the end product, that is the mobile phone A, which has a cover B bearing the motif X (that is cover B+X), is checked. It is verified whether the printing quality is adequate and whether the connection between the cover panel and mobile phone has been made correctly. Customer data K could also be inserted in this sub-process data record comprising the process data P11 and P12, should it also be intended to verify whether the motif X actually produced corresponds to the motif X on the original 11 (not shown).

The customer data K in the customer data record 4 are therefore combined at a plurality of suitable points with the process data record 3, resulting in an item produced by process-controlled manufacturing, which takes account of the wishes of the customer and at the same time meets all the manufacturer's quality specifications.

The customer data record 4 may also contain personal and address information, so that the resulting mobile phone AB+X can be supplied through a delivery 9 to the location of the customer data unit 2, that is the home address of the customer or a dealer's address.

The customer data record 4 is used for direct control of the processing/test facilities 7a–7d via the data line 6 and the interface 5. This allows the customer to intervene directing in the manufacturing.

The manufacturer, for safety reasons, may specify the precise data systems definition and/or contents of the interface 5, so as to allow only correspondingly defined and configured customer data records 4 as a supplement to the process data record 3.

In addition, a monitoring device 10 can also be provided in the manufacturer's data unit 1, by way of which an automated or personal communication can be conducted with the customer data unit 2, which may relate to technical and non-technical aspects of the transmitted customer data record 4. The monitoring device 10, however, is only a possible option. If necessary or required, the data line 6 can also be partially or entirely blocked by means of the monitoring device 10.

In the process-controlled mass production of items, especially consumer goods, the manufacturer often first routinely manufactures a standard production with a limited number of standard versions, in order to provide the dealers with a basic stock. The invention now allows the continuous and inexpensive, optimized process-controlled manufacture to be adjusted to customized modifications, provided that a corresponding customer data record 4 is available.

The manufacturer's data unit 1 advantageously has a query system in order to determine whether a customer data record 4 exists. If this is not the case, standard products are selected according to a production strategy defined according to marketing policy considerations. Thus, it may be determined, for example that the mobile phone will generally be produced with a red, yellow or blue cover panel.

If, on querying, it is then established that a customer data record 4 exists, instead of resetting the usual print colour to red, yellow or blue in the print station 7a, the original motif defined by the customer data K will be set automatically and directly, in particular without resetting the print station 7a. In the test station 7d, this original motif is then also checked for correct application. The scanning system is not shown in FIG. 2.

The invention enables the inexpensive mass production or large-scale production to be customized in specific areas, so as to allow inexpensive continuous mass production to be customized to an extent hitherto known only in a more manual one-off production.

The invention has a wealth of possible applications in addition to the example cited of a mobile phone with an customized cover.

It permits customized printing of garments, ties and bed linen. It is possible to manufacture personalized bottle labels or watch faces. Different and individual knitwear motifs, monograms and other forms of customization of clothing are feasible. Imaginative items of clothing can be produced especially for children, as can bed linen with children's favourite motifs, for example.

The footbed and the fit of shoes can be designed according to the respective, actual anatomical data of the customer.

Sports articles, too, such as skateboards, skis etc. can be made to any design. Individual colours and shapes can be used in the design of telecommunications equipment such as radios and television sets.

All conceivable motifs can also be applied in the printing of furniture and the production of all manner of veneers.

The invention can also be employed in specialized processes of any complexity and can thus be used, for example, for the individual design of the interiors of manufactured cars by means of specific shades or textures. Furthermore spring strengths and degrees of damping adapted to suit the user can be achieved in the car seats in motor vehicles, for example.

Customization can also be applied to toys, for example by providing toys with speech functions (e.g. teddy bears) having the customer's voice tone. The memory chip incorporated in the toy may be individually programmable by the customer.

In the case of products which may consist of a mixture or combination of proportions (e.g. cosmetics), individual user formulae or dosages of the quantities of individual additives can be employed. Different forming of parts at machining stations when milling and turning, for example, is also conceivable.

To sum up, the invention may be said to allow the manufacturer or supplier to fulfil the exact wishes of the customer whilst retaining the advantages of inexpensive, process-controlled manufacture. The customer may incorporate his or her ideas directly into the manufacturing process for the item they have ordered. Direct communication can take place between the customer and the manufacturer without the need for intermediaries such as dealers, advertising agencies etc. The customer can thereby also inform the manufacturer immediately of any modifications required, so that these can be promptly and directly implemented.

Moreover, as described above the present invention provides a method for the process-controlled manufacture of an item such as a consumer good or capital good, for a customer, especially an end-user. The method includes at least one processing phase such as production, assembly, quality control and/or dispatch that is conducted at the manufacturer or at the supplier of the manufacturer of the item. Further, according to the method operations are performed by processing and/or test facilities in the processing phase or individual processing phases according to at least one assigned process data record of a manufacturer's data unit. The inventive method further includes the steps of compiling at least one customer data record, the customer data recording containing specific characteristics (e.g. color, shape, function) selected by the customer. The customer data record is then used to replace, supplement and/or modify the process data record of the manufacturer's data unit in such a way that the item manufactured includes with specific characteristics selected by the customer.

Further, as described above, the present invention provides a customized item that is manufactured in a series of production steps, and the item includes a number of standard characteristics specified by the manufacturer and at least one characteristic selected by the customer. For example, if the item including the manufacture specified characteristics is represented by the letters "AB" and the customer specified characteristic is represented by the letter "X" then the final manufactured item according to the invention includes at least the characteristics "AB+X".

As also described above, the present invention provides a manufacturer's data unit of a manufacturer or a manufacturer's supplier of an item manufactured in a series of production steps. The manufacture's data unit includes a manufacture's data bank with at least one process data record for controlling the manufacturer of an item by controlling a series of manufacturing steps in a continuous manufacturing process. The process data record specifies a plurality of standard characteristics to be included within the manufactured item which are imparted to the manufactured item, via the manufacturing steps. The manufacturer's data bank also includes at least one interface for replacing, modifying and/or supplementing the at least one process data record with data supplied by a customer. The data supplied by the customer specifying at least one characteristic to be included within the manufactured item. In this manner, the manufactured item includes at least one characteristic specified by the customer.

What is claimed is:

1. A method for manufacturing a consumer item by a plurality of manufacturing steps comprising:

providing a manufacturer's process data record, said manufacturer's process data record including instructions to control a plurality of sequential and continuous manufacturing processes such that a manufactured item includes a plurality of manufacturer specified characteristics;

conducting a plurality of sequential and continuous manufacturing processes in accordance with said instructions to produce said manufactured item so that said manufactured item includes said plurality of manufacturer specified characteristics;

prior to at least one of said sequential manufacturing processes determining whether a customer data record exists, said customer data record including instructions to replace, supplement and/or modify the instructions included in said manufacturer's process data record so that said manufactured item includes at least one characteristic specified by a customer;

if said customer data record exists, automatically replacing, supplementing and/or modifying the instructions included in said manufacturer's process data record in accordance with the instructions included in said customer data record and then completing said plurality of sequential and continuous manufacturing processes to thereby produce said manufactured item so that said manufactured item includes said at least one characteristic specified by a customer;

if said customer data record exists, changing certain data fields in the process data record that are provided for insertion of the customer data record if the safety of the manufacturing process is endangered;

if said customer data record exists checking the content of the customer data record and blocking customer data record which does not conform with the manufacturer's product philosophy;

if said customer data record exists, monitoring the customer data record by automated queries;

if said customer data record does not exist, completing said plurality of sequential and continuous manufacturing processes only in accordance with said instructions included in said manufacturer's process data record to thereby produce said manufactured item so that it only includes said plurality of manufacturer specified characteristics.

2. The method according to claim 1, wherein said manufacturer's data record is stored in a manufacturer's data bank contained on a manufacturer's data unit, and further comprising the step of:

providing an interface to said manufacturer's data bank for submitting said customer data record to said manufacturer's data bank.

3. The method according to claim 2, wherein said customer data record is stored on a customer data unit, and further comprising the step of:

automatically establishing a communication connection between said customer data unit and said manufacturer's data unit to automatically determine if said customer data exists.

4. The method according to claim 1, wherein said customer data record is complied from information supplied by the customer.

5. The method according to claim 4, wherein said information is obtained from one of an original graphic, audio or visual element.

6. The method according to claim 5, wherein said information for said customer data record is obtained by digitalizing one of said original graphic, audio or visual element.

7. The method according to claim 1, further comprising the step:

prior to automatically replacing, supplementing and/or modifying the instructions included in said manufacturer's process data record in accordance with the instructions included in said customer data record, conducting a check on the data of said customer data record.

8. A manufactured consumer item manufactured in accordance with the method of claim 1, wherein said manufactured item includes at least one characteristic specified by the customer.

9. The manufactured consumer item according to claim 8, wherein said characteristic specified by said customer is a surface characteristic formed on a surface of said manufactured item.

10. The manufactured consumer item according to claim 9, wherein said surface characteristic is formed by one of inscription, coating or other surface treatment procedure.

11. The manufactured consumer item according to claim 8, wherein said characteristic specified by said customer relates to a memory module contained with said manufactured item.

12. The manufactured consumer item according to claim 8, wherein said characteristic specified by said customer relates to an aesthetic characteristic of said manufactured item.

13. A manufacturer's data unit comprising:

a manufacturer's data bank for storing a manufacturer's process data record, said manufacturer's data record including instructions to control a plurality of sequential and continuous manufacturing processes such that a manufactured item includes a plurality of manufacturer specified characteristics;

means for automatically determining whether a customer data record exists, said customer data record including instructions to replace, supplement and/or modify the instructions included in said manufacturer's process data record so that said manufactured item includes at least one characteristic specified by a customer;

wherein if said customer data record exists, automatically replacing, supplementing and/or modifying the instructions included in said manufacturers process data record in accordance with the instructions included in said customer data record and then completing said plurality of sequential and continuous manufacturing processes to thereby produce said manufactured item so that said manufactured item includes said at least one characteristic specified by a customer;

wherein if said customer data record exists changing certain data fields in the process data record that are provided for insertion of the customer data record if the safety of the manufacturing process is endangered;

wherein if said customer data record exists checking the content of the customer data record and blocking customer data record which does not conform with the manufacturer's product philosophy; and wherein if said customer data record exists, monitoring the customer data record by automated queries; and wherein if said customer data record does not exist, completing said plurality of sequential and continuous manufacturing processes only in accordance with said instructions included in said manufacturer's process data record to thereby produce said manufactured item so that it only includes said plurality of manufacturer specified characteristics.

14. The manufacturer's data unit according to claim 13, wherein said means for determining whether a customer data record exists comprises:

an interface for submitting to said manufacturer's data bank said customer data record, and a communication connection between a customer data unit on which said customer data record is stored and said manufacturer's data unit.

15. The manufacturer's data unit according to claim 13, wherein said customer data record is complied from information supplied by the customer.

16. The manufacturers data unit according to claim 15, wherein said information is obtained from one of an original graphic, audio or visual element.

17. The manufacturer's data unit according to claim 16, wherein said information for said customer data record is obtained by digitalizing one of said original graphic, audio or visual element.

18. The manufacturer's data unit according to claim 14, wherein in said customer data unit is a personal computer of a customer.

19. The manufacturers data unit according to claim 14, wherein said customer data unit is a personal computer at a sales outlet.

20. The manufacturer's data unit according claim 14, wherein said customer data record includes at least one of the following:

order data;

production data; and customer data.

* * * * *

UNITED STATES PATENT AND TRADEMARK OFFICE
CERTIFICATE OF CORRECTION

PATENT NO. : 6,748,286 B1  Page 1 of 1
DATED : June 8, 2004
INVENTOR(S) : Losch, Christoph It is certified that error appears in the above-identified patent and that said Letters Patent is hereby corrected as shown below:

<u>Title page,</u>
Item [30], Foreign Priority Application Data, change "199 21 063" to -- 199 21 063.2 --

Signed and Sealed this

Twenty-seventh Day of July, 2004

JON W. DUDAS
*Acting Director of the United States Patent and Trademark Office*